US010327241B2

(12) United States Patent
Kadous

(10) Patent No.: US 10,327,241 B2
(45) Date of Patent: Jun. 18, 2019

(54) SOLVING DEAFNESS IN DIRECTIONAL CLEAR CHANNEL ASSESSMENT (CCA)

(71) Applicant: QUALCOMM Incorporated, San Diego, CA (US)

(72) Inventor: Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 107 days.

(21) Appl. No.: 15/464,998

(22) Filed: Mar. 21, 2017

(65) Prior Publication Data
US 2018/0132236 A1 May 10, 2018

Related U.S. Application Data

(60) Provisional application No. 62/418,525, filed on Nov. 7, 2016.

(51) Int. Cl.
H04W 72/04 (2009.01)
H04B 7/0408 (2017.01)
H04L 1/00 (2006.01)
H04W 72/12 (2009.01)
H04W 74/00 (2009.01)
(Continued)

(52) U.S. Cl.
CPC ...... H04W 72/0446 (2013.01); H04B 7/0408 (2013.01); H04B 7/0617 (2013.01); H04B 7/0695 (2013.01); H04L 1/0002 (2013.01); H04W 72/046 (2013.01); H04W 72/12 (2013.01); H04W 74/004 (2013.01); H04W 74/0816 (2013.01)

(58) Field of Classification Search
None
See application file for complete search history.

(56) References Cited

U.S. PATENT DOCUMENTS 8,964,721 B1 2/2015 Liu et al.
2005/0169232 A1 8/2005 Sakoda et al.
(Continued)

FOREIGN PATENT DOCUMENTS

WO WO-2007053072 A1 5/2007

OTHER PUBLICATIONS

International Search Report and Written Opinion—PCT/US2017/055803—ISA/EPO—dated Jan. 25, 2018.
(Continued)

Primary Examiner — Diane L Lo
(74) Attorney, Agent, or Firm — Haynes and Boone, LLP

(57) ABSTRACT

Wireless communications systems and methods related to solving deafness problems in directional clear channel assessment (CCA) procedures. A first wireless communication device transmits, to a second wireless communication device in a first beam direction, a first channel reservation for receiving a data burst. The first wireless communication device receives, from the second wireless communication device, a first portion of the data burst. The first wireless communication device transmits, in the first beam direction, a second channel reservation for receiving one or more remaining portions of the data burst. The first wireless communication device receives, from the second wireless communication device, a second portion of the data burst. Other aspects, embodiments, and features are also claimed and described.

30 Claims, 11 Drawing Sheets

(51) Int. Cl.
*H04B 7/06* (2006.01)
*H04W 74/08* (2009.01)

(56) References Cited

U.S. PATENT DOCUMENTS

| | | | |
|---|---|---|---|
| 2008/0117865 A1* | 5/2008 | Li | H04W 74/0808 370/329 |
| 2008/0298306 A1* | 12/2008 | Larsson | H04L 1/0002 370/328 |
| 2013/0195036 A1 | 8/2013 | Quan et al. | |
| 2016/0128050 A1 | 5/2016 | Sheu et al. | |
| 2016/0353467 A1 | 12/2016 | Nekovee | |

OTHER PUBLICATIONS

Loch A., et al., "Millimeter-Wave Blind Spots: Mitigating Deafness Collisions Using Frame Aggregation," Millimeter-wave Networking Workshop (mmNet)2016, 6 pages.
Na W., et al., "Deafness-Aware MAC Protocol for Directional Antennas in Wireless Ad Hoc Networks," Ad Hoc Networks, 2015, vol. 24, pp. 121-134.
$2^{nd}$ Written Opinion—PCT/US2017/055803—ISA/EPO—dated Sep. 19, 2018.

* cited by examiner

SOLVING DEAFNESS IN DIRECTIONAL CLEAR CHANNEL ASSESSMENT (CCA)

CROSS REFERENCE TO RELATED APPLICATIONS

The present application claims priority to and the benefit of the U.S. Provisional Patent Application No. 62/418,525, filed Nov. 7, 2016, which is hereby incorporated by reference in its entirety as if fully set forth below and for all applicable purposes.

TECHNICAL FIELD

The technology discussed in this disclosure relates generally to wireless communication systems, and more particularly to addressing and/or solving deafness or blind or hidden node scenarios in directional clear channel assessment (CCA) and/or listen-before-talk (LBT) procedures. Embodiments enable and provide solutions and techniques for communication network components (e.g., mmWave systems) to improve medium access, link budget, and contention issues by aiming to alleviate periodic blind node challenges.

INTRODUCTION

A wireless communication network may include a number of base stations (BSs) that can support communication for a number of user equipment devices (UEs). In recent years, the carrier frequencies at which BSs and UEs communicate have continued to increase and include larger bandwidths. To take advantage of these higher frequencies, more antennas in the same physical space have been used. For these higher frequency bands to be useful and approximate the same coverage radius as prior technologies (such as 2G, 3G or 4G), however, more beam forming gain (and more accurate) is becoming necessary.

Millimeter wave (mmWav or mmW) systems are promising in meeting the growing mobile service demands due to the larger available bandwidths when compared to conventional wireless systems. However, mmWav systems have higher path loss (PL) than the conventional wireless systems. To overcome the higher PL, BSs may perform beamforming, which may include analog beamforming and digital beamforming, to create narrow beam patterns for transmissions to UEs. Hybrid beamforming with narrow beam patterns can improve link budget and signal-to-noise ratios (SNRs).

In some mmWav systems, a BS or a UE may perform a directional LBT procedure to contend for access to a shared radio frequency spectrum. For example, a BS may perform channel sensing in a particular beam direction towards a UE to determine whether a channel in the particular beam direction is available. When the BS determines that the channel is available, the BS may exchange channel reservation (CR) signals with the UE over the channel to reserve the channel. Subsequently, the BS may transmit data to the UE in the particular beam direction. When another BS or UE detects the CR signals over the channel, the other BS or UE may wait for the transmission in progress to end before initiating a transmission over the channel.

A direction LBT blindness or deafness occurs when the other BS or UE switches to the particular beam direction after the CR signals are exchanged and mistakenly determines that the channel in the particular beam direction is available. The other BS or UE may begin to transmit data over the channel, causing collisions. Solving the directional LBT blindness or deafness challenges may reduce collisions and improve wireless communication performance.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, comprising transmitting, by a first wireless communication device to a second wireless communication device, a first channel reservation for receiving a data burst; receiving, by the first wireless communication device from the second wireless communication device, a first portion of the data burst; transmitting, by the first wireless communication device, a second channel reservation for receiving one or more remaining portions of the data burst; and receiving, by the first wireless communication device from the second wireless communication device, a second portion of the data burst.

In an additional aspect of the disclosure, a method of wireless communication, comprising determining, by a first wireless communication device, a first channel reservation status in a first beam direction; transmitting, by the first wireless communication device in the first beam direction to a second wireless communication device when the first channel reservation status is determined to indicate no channel reservation in the first beam direction, a first portion of a data burst; and transmitting, by the first wireless communication device in the first beam direction to the second wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

In an additional aspect of the disclosure, an apparatus comprising a transmitter configured to transmit, to a first wireless communication device, a first channel reservation for receiving a data burst; and transmit a second channel reservation for receiving one or more remaining portions of the data burst; and a receiver configured to receive, from the first wireless communication device, a first portion of the data burst; and receive, from the first wireless communication device, a second portion of the data burst.

In an additional aspect of the disclosure, an apparatus comprising a processor configured to determine a first channel reservation status in a first beam direction; and a transmitter configured to transmit, in the first beam direction to a first wireless communication device when the first channel reservation status is determined to indicate no channel reservation in the first beam direction, a first portion of a data burst; and transmit, in the first beam direction to the first wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

Still yet some embodiments are configured to address and solve the blind/deaf node challenges. For example, a wireless communication device may ask a receiver to transmit a reservation signal "CR" multiple times during a reception scheduled by an eNB. In this way, other communication nodes have a chance to listen to this "CR" and back off accordingly. Thus communication nodes can collectively address hidden node scenarios.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
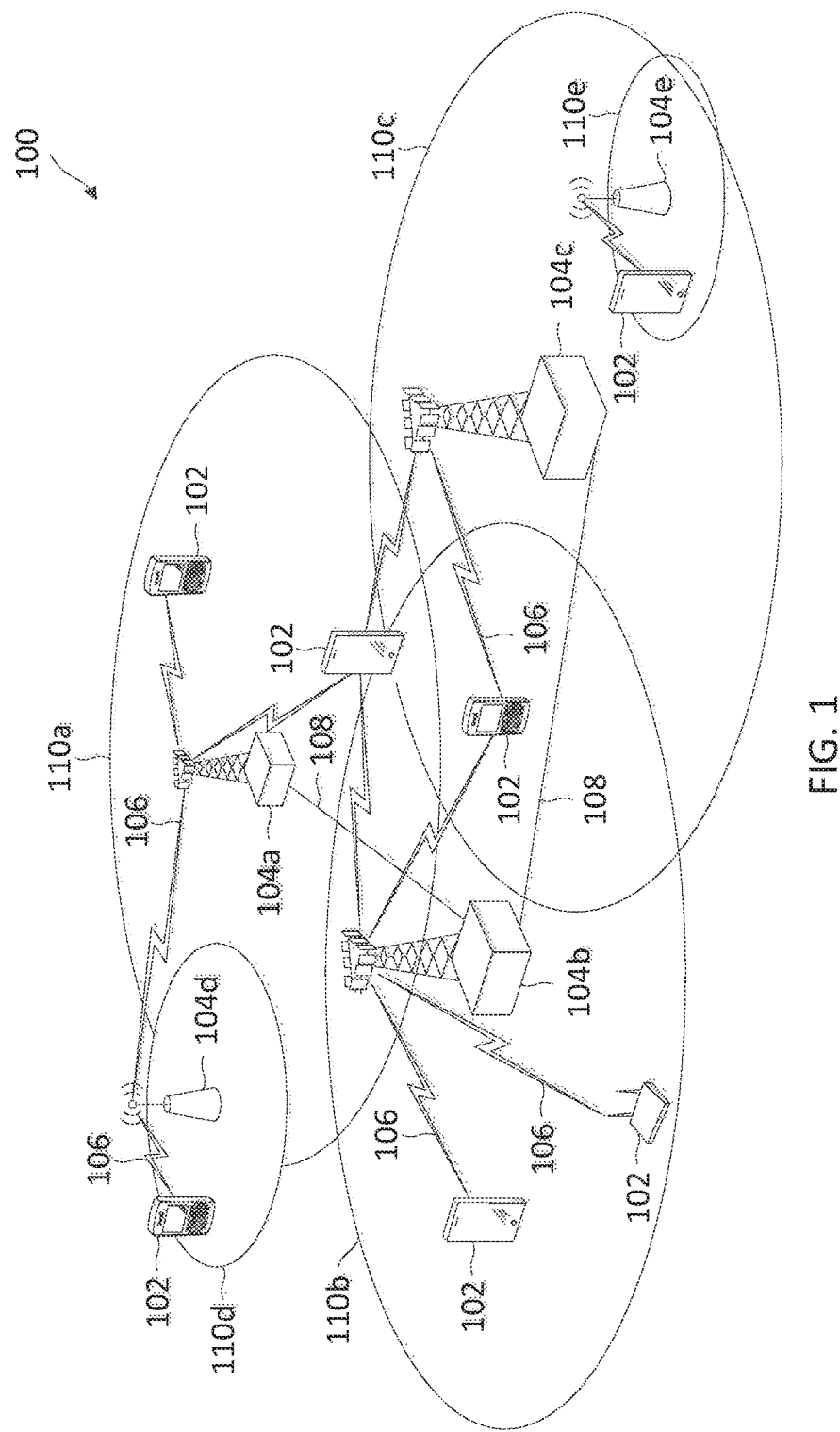
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UNITS). 3GPP Long Term Evolution (LTE) and LTE-Advanced (LTE-A) are new releases of UNITS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)), operating in mmWav bands network.

The present disclosure describes an improved LBT procedure that may avoid directional LBT deafness in a wireless communication network. In some disclosed embodiments, a transmitter may transmit a data burst to a receiver over a channel in a pre-determined beam direction towards the receiver. The receiver may transmit multiple channel reservation (CR) signals in the beam direction over the duration of the data burst transmission to protect the channel from other transmissions. For example, a BS may monitor a channel in a particular beam direction towards a UE for CR signals. When no CR signal is detected, the BS may transmit a data burst in multiple portions to the UE in the particular beam direction. The BS may transmit the portions of the data burst in a number of transmission time intervals (TTIs) with a transmission gap between each portion. The transmission gaps allow the UE to send CR signals to indicate that the channel is busy or reserved. The repetitive transmissions of the CR signals over the data burst duration allow another transmitter switching to the particular beam direction during the transmission of the data burst to detect at least one CR signal, and thus avoiding LBT deafness occurrences. In an embodiment, the other transmitter may listen to the channel for at least one TTI. The disclosed embodiments may be applied to any transmitter/receiver pair in a wireless communication network.

FIG. 1 illustrates a wireless communication network 100 according to embodiments of the present disclosure. The network 100 may include a number of UEs 102, as well as a number of BSs 104. The BSs 104 may include an Evolved Node B (eNodeB) or a next Generation Node B (gNB). A BS 104 may be a station that communicates with the UEs 102 and may also be referred to as a base transceiver station, a node B, an access point, and the like. The network 100 may include a cellular network and/or a non-cellular wireless network.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104*a*, 104*b* and 104*c* are examples of macro BSs for the coverage areas 110*a*, 110*b* and 110*c*, respectively. The BSs 104*d* and 104*e* are examples of pico and/or femto BSs for the coverage areas 110*d* and 110*e*, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time. Operations may alter between synchronous or asynchronous operation as desired or needed depending upon design or implementation parameters.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers (sometimes referred to as tones, bins, or the like). Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the BSs 104 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. In a TDD mode, UL and DL transmissions occur at different time periods using the same frequency band. For example, a subset of the subframes in a radio frame may be used for DL transmissions and another subset of the subframes may be used for UL transmissions. The DL and UL subframes can be shared among the BSs 104 and the UEs 102, respectively.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In an embodiment, the network 100 operates in a millimeter wave (mmWav) band, for example, at about 20 gigahertz (GHz) to about 60 GHz. To overcome the high path or propagation loss in the mmWav band, the BSs 104 and/or the UEs 102 may form narrow directional beams for transmissions. For example, a BS 104 may perform beam searching and/or tracking to determine a dominant or strongest beam direction to a UE 102 and transmit data to the UE 102 using a directional beam in the dominant beam direction. In some embodiments, the network 100 may operate in a spectrum shared among multiple operators and/or other wireless communication technologies. In such embodiments, the BSs 104 and/or the UEs 102 may implement a LBT or a CCA scheme to avoid collisions, as described in greater detail herein.

Figure 2:
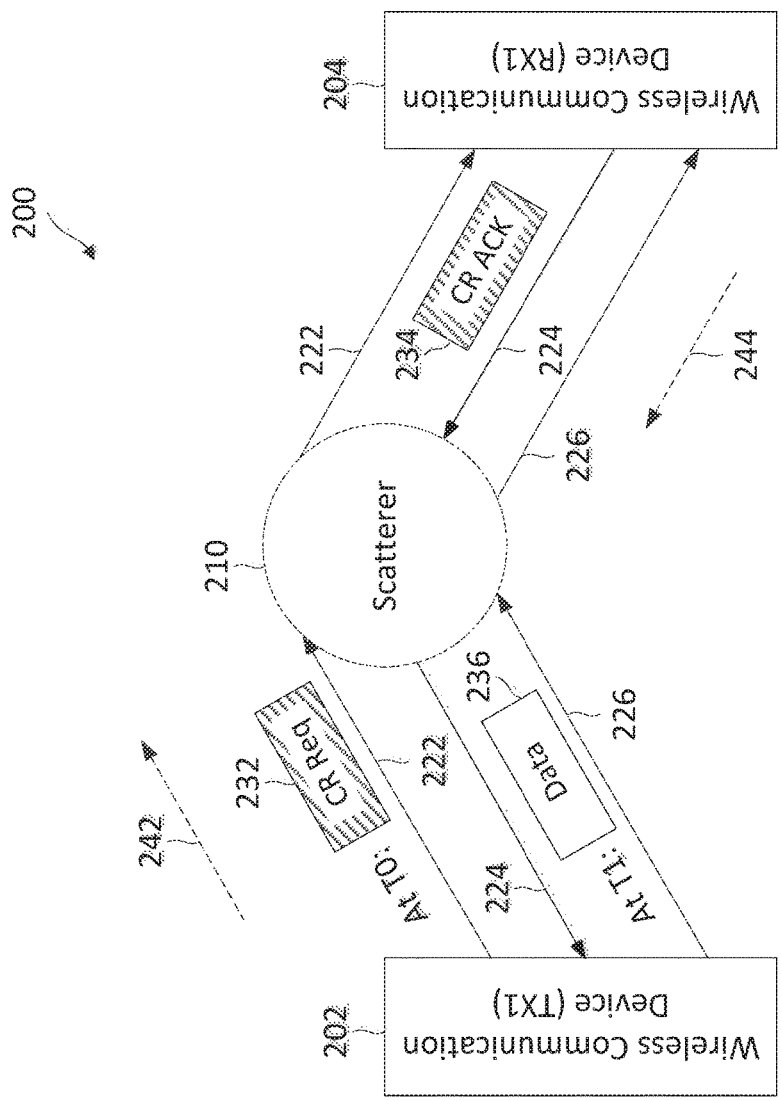
FIG. 2 illustrates a listen-before-talk (LBT) procedure in less communication network 200 according to embodiments of the present disclosure.

FIG. 2 illustrates a LBT procedure in a wireless communication network 200 according to embodiments of the present disclosure. The network 200 corresponds to a portion of the network 100. FIG. 2 illustrates two wireless communication devices 202 and 204 for purposes of simplicity of discussion. Yet other embodiments of the present disclosure may scale to many more transmitting wireless communication devices 202 and 204 and/or other network-type models (e.g., typical cellular and non-cellular arrangements with fixed and/or non-fixed components). The wireless communication devices 202 and 204 are a transmitter/receiver pair. For example, the wireless communication device 202 may be a BS 104 and the wireless communication device 204 may be a UE 102. Alternatively, the wireless communication device 202 may be a UE 102 and the wireless communication device 204 may be a BS 104.

In the network 200, the wireless communication devices 202 and 204 communicate with each other in a mmWav band. The wireless communication devices 202 and 204 may perform beam selection to determine a best beam combination to communicate with each other over a scatterer 210 (e.g., a mmWav transmission medium). For example, the wireless communication device 202 selected a beam direction 242 for transmission to the wireless communication device 204 and the wireless communication device 204 selected a beam direction 244 for transmission to the wireless communication device 202. The beam directions 242 and 244 may be along the same beam path or along different beam paths.

As an example, the wireless communication device 202 (shown as TX1) has data to send to the wireless communication device 204 (shown as RX1). The wireless communication device 202 may listen to the channel in the beam direction 242 to determine whether the channel is available based on CR signal detections. CR signals may include a pre-determined sequence or a pre-determined pilot pattern. When the channel is determined to be clear, the wireless communication device 202 exchange CR signals with the wireless communication device 204 before initiating data transmission to the wireless communication device 204. For example, at a time T0, the wireless communication device 202 sends a CR request (CR Req) message 232 to the wireless communication device 204 in the beam direction 242 as shown by the arrows 222. The wireless communication device 204 acknowledges the CR request message 232 by sending a CR acknowledgement (ACK) message 234 to the wireless communication device 202 in the beam direction 244 as shown by the arrows 224. At a time T1, upon receiving the CR ACK message 234, the wireless communication device 202 sends a data burst 236 to the wireless communication device 204 in the beam direction 242 as shown by the arrows 226. In some embodiments, the CR request message 232 may indicate a duration of the data burst 236. The transmission of the CR ACK message 234 enables other wireless communication devices, which may include BSs and UEs, listening to the channel to recognize that the channel is unavailable or busy.

Figure 3:
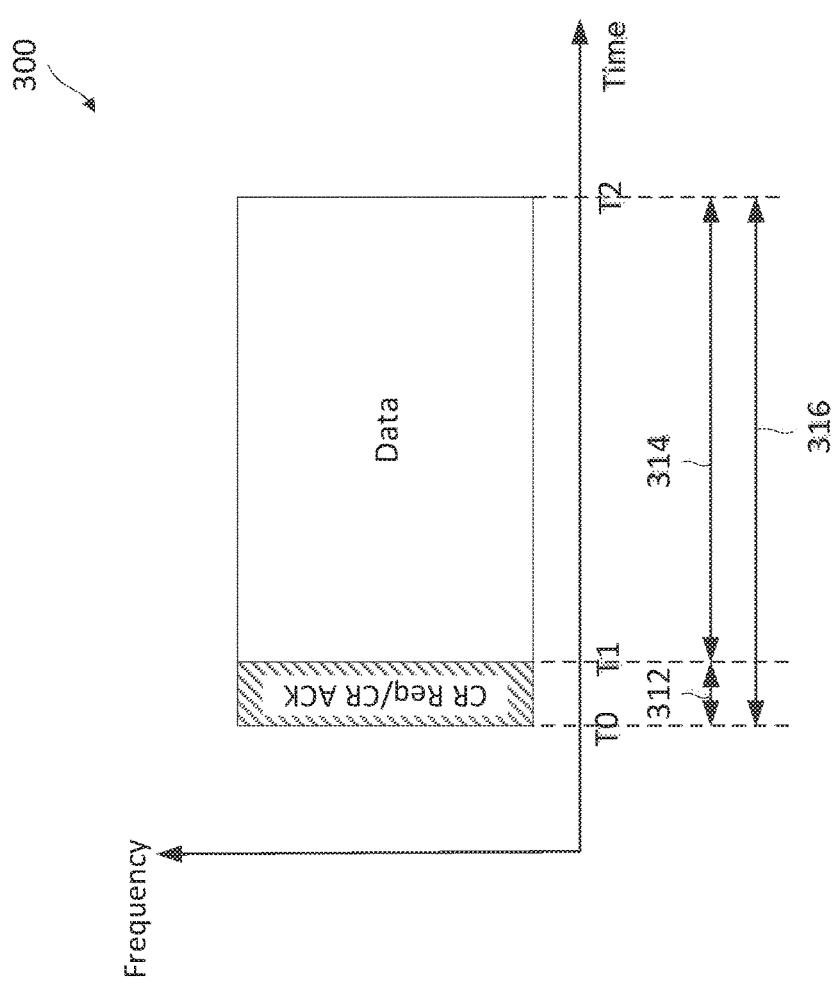
FIG. 3 illustrates a transmission scheme that facilitates LBT according to embodiments of the present disclosure.

FIG. 3 illustrates a transmission scheme 300 that facilitates LBT according to embodiments of the present disclosure. The scheme 300 is employed by the wireless communication devices 202 and 204. In FIG. 3, the x-axis represents time in some constant units and the y-axis represents frequency in some constant units. In the scheme 300, the wireless communication device 202 and the wireless communication device 204 exchange the CR request message 232 and the CR ACK message 234 in a CR time interval 312 from a time T0 to a time T1. The wireless communication device 202 sends the data burst 236 in a data time interval 314 from the time T1 to a time T2. The CR request message 232 may indicate a receive data burst reservation period 316 including the CR time interval 312 and the data time interval 314. In some embodiment, the CR request message 232 and the CR ACK message 234 may each span about one symbol. Thus, the CR time interval 312 may include about two symbols. The data time interval 314 may include a plurality of symbols for carrying the data burst 236.

Figure 4:
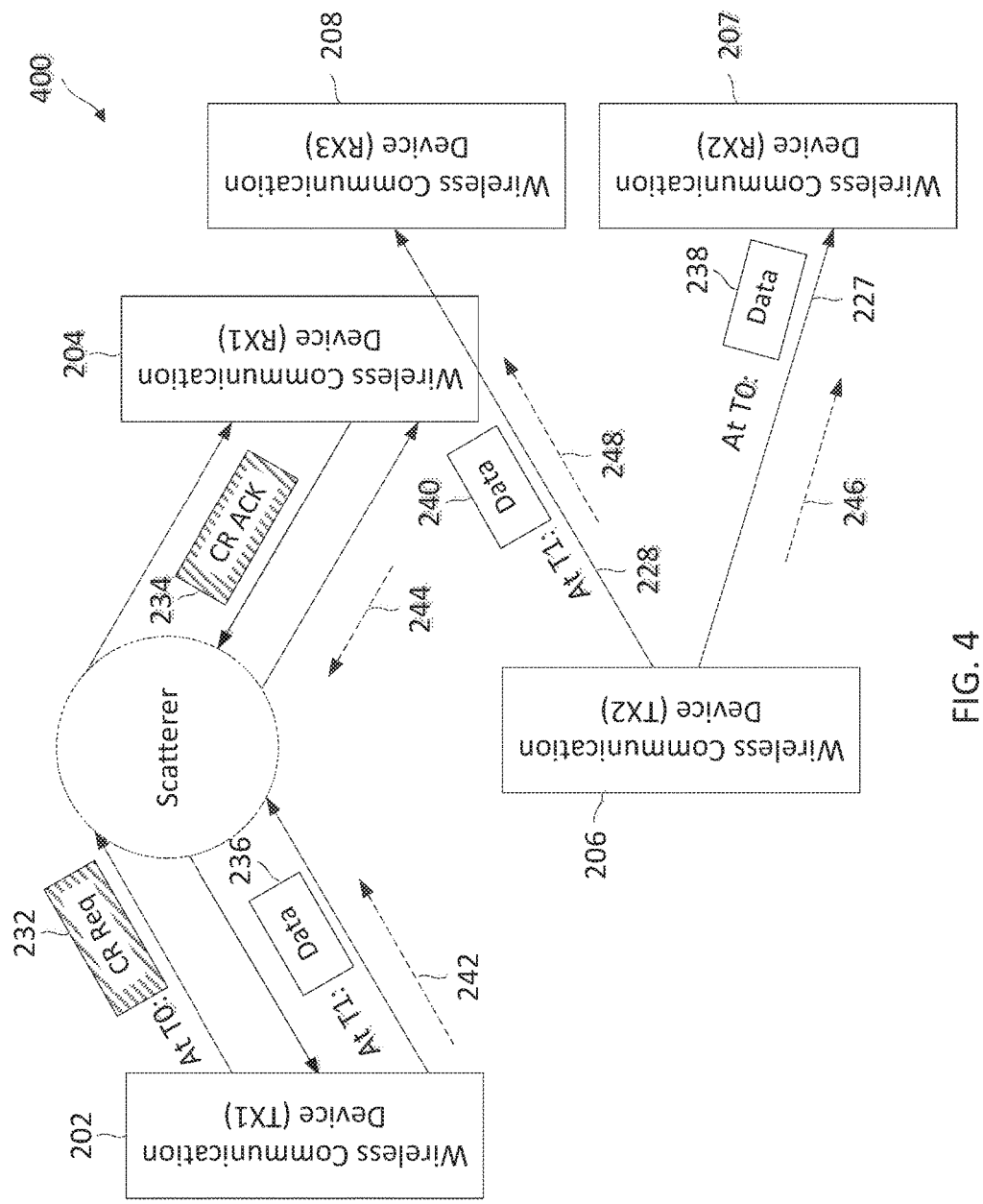
FIG. 4 illustrates a directional LBT deafness scenario in a wireless communication network according to embodiments of the present disclosure.

FIG. 4 illustrates a directional LBT deafness scenario in a wireless communication network 400 according to embodiments of the present disclosure. The network 400 is similar to the network 200, and includes three additional wireless communication devices 206, 207, and 208 similar to the wireless communication devices 202 and 204. In the network 400, the wireless communication devices 202 and 204 may employ similar mechanisms as in the network 200 to exchange CR signals at a time T0 before initiating data transmission at a time T1.

Due to differing time instances of communication, the devices may not know that other devices are attempting communication and miss messages. For example, at the time T0, while the wireless communication devices 202 and 204 exchange the CR reserved message 232 and the CR ACK message 234 in the beam directions 242 and 244, respectively, the wireless communication device 206, denoted as TX2, is serving a data burst 238 to the wireless communication device 207 (e.g., a spatially far node), denoted as RX2, in a beam direction 246 as shown by the arrow 227. Since the beam direction 246 is not in a direction towards the wireless communication device 204, the wireless communication device 206 may not detect the CR ACK message 234.

At about the time T1 or slightly after, the wireless communication device 206 switches to a beam direction 248 to serve the wireless communication device 208, denoted as RX3. As shown, the beam direction 248 is in a direction towards the wireless communication device 204. Since the wireless communication device 206 missed the CR ACK message 234 transmitted earlier, the wireless communication device 206 may mistakenly determine that the channel in the beam direction 248 is clear and begin to transmit a data burst 240 to the wireless communication device 208 in the beam direction 248 as shown by the arrow 228. The transmission of the data burst 240 may jam or collide with the transmission of the data burst 236. The wireless communication device 206 may be referred to as the blind node at which the LBT deafness occurs. In other words, the wireless communication device 206 may be unaware of another using the medium thus not knowing of another node's communication efforts.

Figure 5:
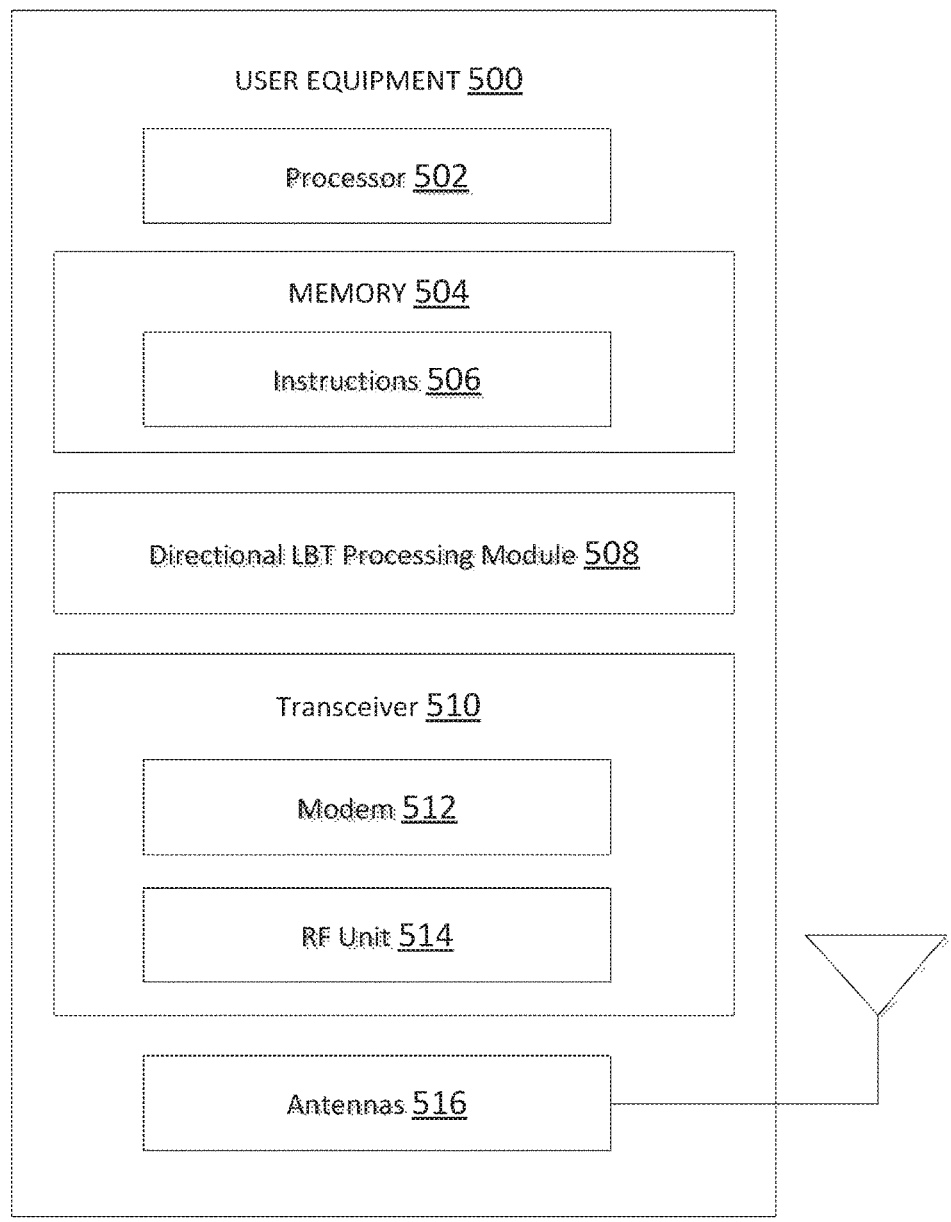
FIG. 5 is a block diagram of a user equipment (UE) according to embodiments of the present disclosure.

FIG. 5 is a block diagram of a UE 500 according to embodiments of the present disclosure. The UE 500 may be a UE 102 or a wireless communication device 202, 204, 206, 207, or 208 as discussed above. As shown, the UE 500 may include a processor 502, a memory 504, a direction LBT processing module 508, a transceiver 510 including a modem subsystem 512 and a RF unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the wireless communication device 202, 204, 206, 207, or 208 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The direction LBT processing module 508 may be used for various aspects of the present disclosure. For example, the direction LBT processing module 508 is configured to perform channel sensing and reserve channels for data reception, as described in greater detail herein.

As shown, the transceiver 510 may include the modem subsystem 512 and the RF unit 514. The transceiver 510 can be configured to communicate bi-directionally with other devices, such as the BSs 104 and the wireless communication device 202, 204, 206, 207, and 208. The modem subsystem 512 may be configured to modulate and/or encode the data from the memory 504 and/or the direction LBT processing module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 102, a BS 104, or a wireless communication device 202, 204, 206, 207, or 208. The RF unit 514 may be further configured to perform beamforming. Although shown as integrated together in transceiver 510, the modem subsystem 512 and the RF unit 514 may be separate devices that are coupled together at the UE 102 to enable the UE 102 to communicate with other devices.

The RE unit 514 may provide the modulated and/or processed data, e.g. data packets (or, more generally, data messages that may contain one or more data packets and other information), to the antenna 516 for transmission to one or more other devices. This may include, for example, transmission of channel reservations and schedules according to embodiments of the present disclosure. The antenna 516 may further receive data messages transmitted from other devices. This may include, for example, detection of a channel reservation according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links. The RF unit 514 may configure the antenna 516.

Figure 6:
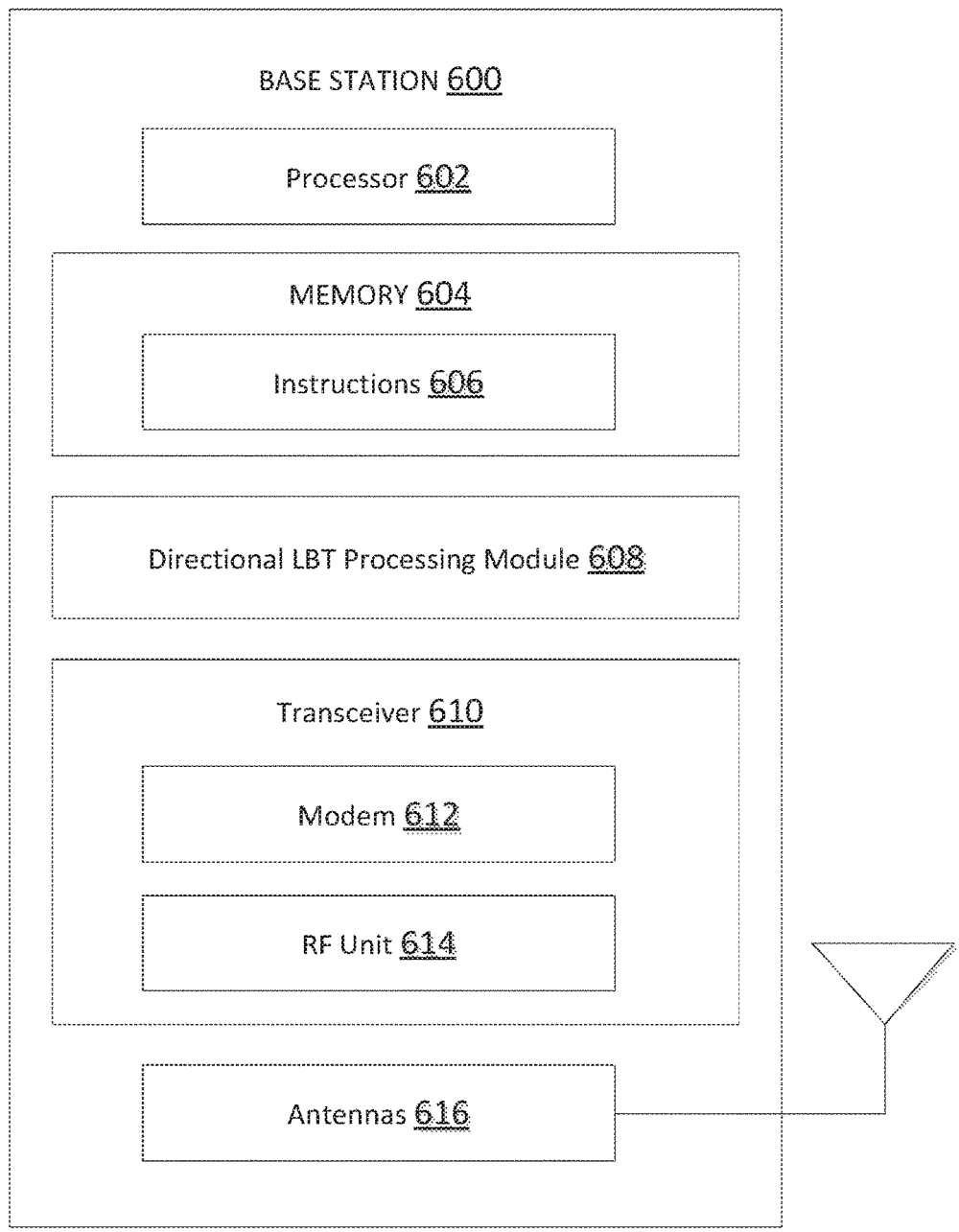
FIG. 6 is a block diagram of a base station (BS) according to embodiments of the present disclosure.

FIG. 6 is a block diagram of an exemplary BS 600 according to embodiments of the present disclosure. The BS 600 may be a BS 104 or a wireless communication device 202, 204, 206, 207, or 208 as discussed above. A shown, the BS 600 may include a processor 602, a memory 604, a direction LBT processing module 608, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 4.

The direction LBT processing module 608 may be used for various aspects of the present disclosure. For example, the direction LBT processing module 608 may perform channel sensing, reserve channels for data reception, and determine transmission schedules that allow for repetitive CR signal transmissions, as described in greater detail herein.

As shown, the transceiver 610 may include the modem subsystem 612 and the RF unit 614. The transceiver 610 can be configured to communicate hi-directionally with other devices, such as the UEs 102 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process perform analog to digital conversion or digital to analog conversion, etc.) modulated/encoded data from the modem subsystem 612 (on outbound transmissions) or of transmissions originating from another source such as a UE 102 or a wireless communication device 202, 204, 206, 207, or 208. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 104 to enable the BS 104 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 102 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

Figure 7:
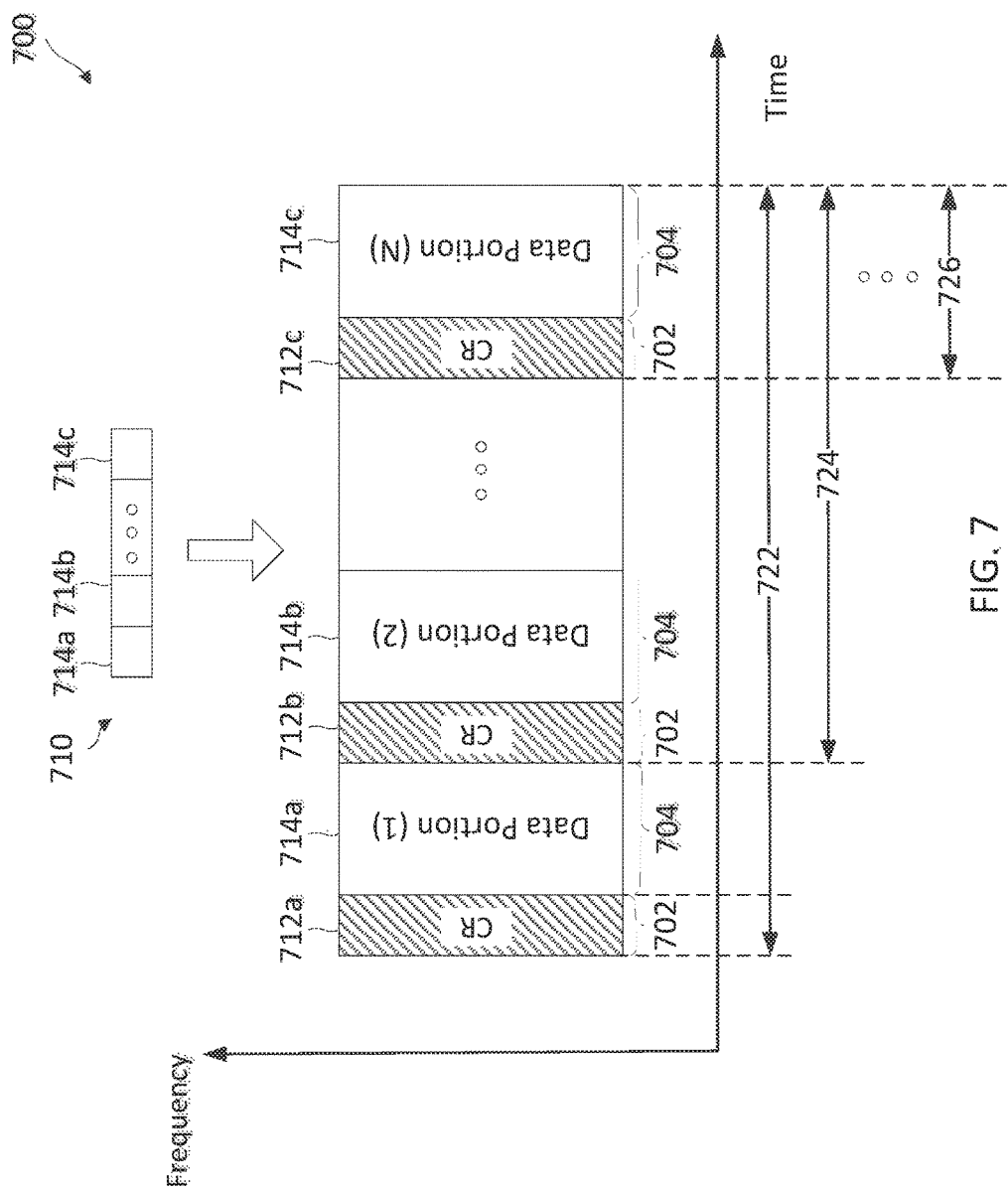
FIG. 7 illustrates an improved LBT scheme according to embodiments of the present disclosure.

FIG. 7 illustrates an improved LBT scheme 700 according to embodiments of the present disclosure. The scheme 700 may be employed by wireless communication devices, such as the BSs 104, the UEs 102, and the wireless communication devices 202, 204, 206, 207, and 208. In the scheme 700, a first wireless communication device transmits a data burst 710 (e.g., the data burst 236, 238, and 240) to a second wireless communication device in a particular beam direction (e.g., the beam directions 242, 244, 246, and 248). The data burst 710 is divided into a plurality of portions 714 and transmitted in a plurality of TTI 704 spaced apart by a gap period 702. The data portions 714 are shown as data portion (1), data portion (2), . . . , to data portion (N). In some embodiments, some of the portions 714 may span longer than a TTI 704 or less than a TTI 704.

In order to protect the channel in the particular beam direction for receiving the data burst 710, the second wireless communication device transmits CRs 712 in the gap periods 702. Each CR 712 may indicate a reservation period for receiving remaining data portions 714 of the data burst 710. For example, the CR 712a may indicate a time interval 722 including N TTIs 704 and N gap periods 702. The CR 712b may indicate a time interval 724 including (N−1) TTI 704 and (N−1) gap periods 702. The CR 712c may indicate a time interval 726 including one TTI 704 one gap period. In some embodiments, each CR 712 may span one or more symbols and the gap periods 702 may include transmit-receive switching time for the second wireless communication device to switch between a transmit mode and a receive mode.

As can be seen, the scheme 700 allows a receiver to repeat transmissions of CRs 712 over the duration of the transmission. Thus, when another wireless communication device switches to the particular beam direction after the first CR 712a is sent, the other wireless communication device may detect other CRs 712 (e.g., the CR 712b or 712c). For example, when a wireless communication device switches to a new beam direction, the wireless communication device may listen to a channel in the new beam direction for at least one TTI 704.

Figure 8:
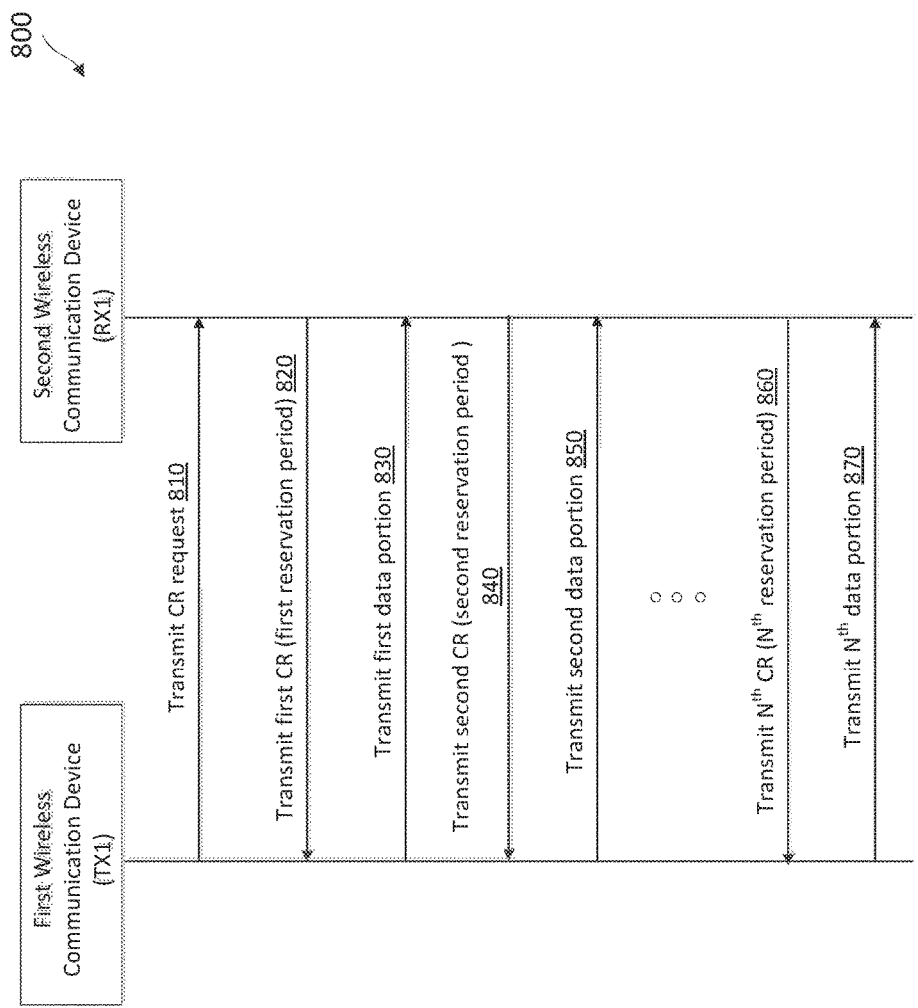
FIG. 8 is a protocol diagram of a method of performing data transmission in an improved LBT procedure according to embodiments of the present disclosure.

FIG. 8 is a protocol diagram of a method 800 of performing data transmission in an improved LBT procedure (e.g., the scheme 700) according to embodiments of the present disclosure. Steps of the method 800 can be executed by computing devices (e.g., a processor, processing circuit, and/or other suitable component) of wireless communication devices, such as the BSs 104, the UEs 102 and the wireless communication devices 202, 204, 206, 207, and 208. The method 800 can be better understood with reference to FIG. 7. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates two wireless communication devices for purposes of simplicity of discussion, though it will be recognized that embodiments of the present disclosure may scale to many more wireless communication devices. The method 800 may employ similar mechanisms as in the scheme 700.

The method 800 may begin after a first wireless communication device (e.g., the wireless communication device 202) and a second wireless communication device (e.g., the wireless communication device 202) selected a best beam combination for communicating with each other. For example, the first wireless communication device selected a first beam direction (e.g., the beam directions 242) and the second wireless communication device selected a second beam direction (e.g., the beam directions 244). At step 810, the first wireless communication device transmits a CR request to the second wireless communication device in the first beam direction. The CR request may indicate a burst duration (e.g., the time interval 722) of a data burst (e.g., the data burst 710).

At step 820, the second wireless communication device sends a first CR (e.g., the CR 712a) in the second beam direction. The first CR reserves the channel in the first beam direction for receiving the data burst. The first CR may indicate a first reservation period including the burst duration. At step 830, the first wireless communication device transmits a first portion (e.g., the data portion 714a) of the data burst to the second wireless communication device in the first beam direction.

At step 840, after receiving the first portion, the second wireless communication device sends a second CR (e.g., the CR 712b) in the second beam direction. The second CR may indicate a second reservation period including a remaining burst duration (e.g. the time interval 724). At step 850, the first wireless communication device transmits a second portion (e.g., the data portion 714b) of the data burst to the second wireless communication device in the first beam direction.

The steps of 840 and 850 may be repeated until all remaining portions of the data burst are transmitted. For example, at step 860, the second wireless communication device transmits a last CR or an $N^{th}$ CR (e.g., the last CR 712c) in the second beam direction to reserve the channel for receiving a last portion or the $N^{th}$ portion (e.g., the data portion 714c) of the data burst. The last CR may indicate an $N^{th}$ reservation period including a remaining burst duration (e.g., the time interval 726). At step 870, the first wireless communication device transmits the last portion or the $N^{th}$ portion (e.g., the data portion 714c) to the second wireless communication device in the first beam direction. Each data portion may be transmitted in a TTI 704 and each CR may be transmitted in a gap period 702.

In an embodiment, the first wireless communication device may be a BS 104. In such an embodiment, the first wireless communication device may determine a schedule for transmitting the data burst and send the schedule to the second wireless communication device. The schedule may include multiple TTIs as shown in the scheme 700. In another embodiment, the first wireless communication may be a UE. In some embodiments, a BS may employ the scheme 700 for scheduling when detecting data collisions based on data delivery performances. In such an embodiment, the first wireless communication device may receive a schedule (e.g., as shown in the scheme 700) for the data burst from the second wireless communication device.

Figure 9:
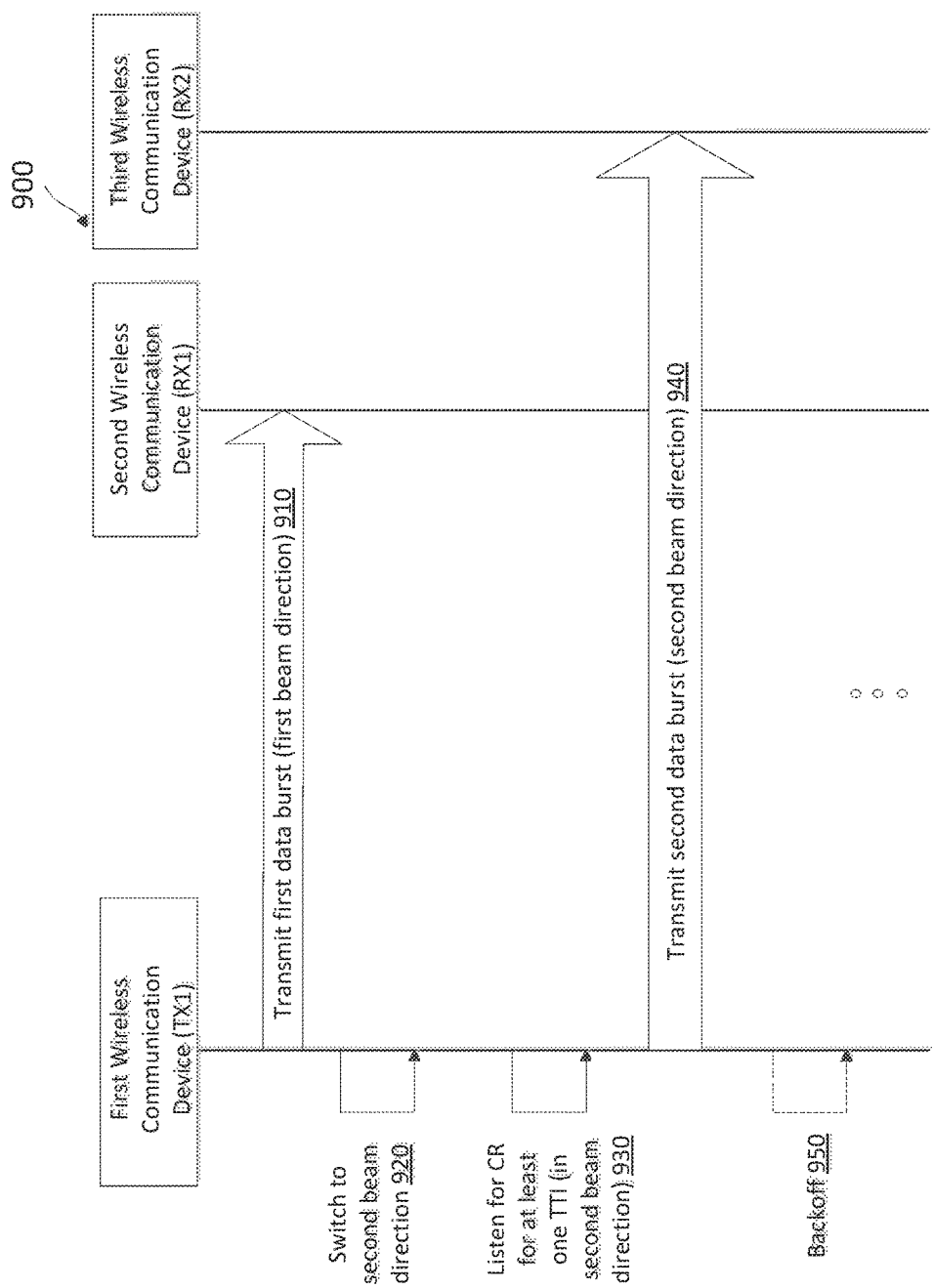
FIG. 9 is a protocol diagram of a method of performing an improved LBT procedure according to embodiments of the present disclosure.

FIG. 9 is a protocol diagram of a method 900 of performing an improved LBT procedure according to embodiments of the present disclosure. Steps of the method 900 can be executed by computing devices (e.g., a processor, processing circuit, and/or other suitable component) of wireless communication devices, such as the BSs 104, the UEs 102 and the wireless communication devices 202, 204, 206, 207, and 208. The method 900 can be better understood with reference to FIG. 7. As illustrated, the method 900 includes a number of enumerated steps, but embodiments of the method 900 may include additional steps before, after, and in between the enumerated steps. In some embodiments, one or more of the enumerated steps may be omitted or performed in a different order. The method 900 illustrates two wireless communication devices for purposes of simplicity of discussion, though it will be recognized that embodiments of the present disclosure may scale to many more wireless communication devices. The method 900 may employ similar mechanisms as in the scheme 700 and the method 800.

At step 910, a first wireless communication device (e.g., the wireless communication device 206), denoted as TX1, transmits a first data burst to a second wireless communication device (e.g., the wireless communication device 207), denoted as RX1, in a first beam direction (e.g., the beam direction 246), for example, by employing the scheme 700 and the method 800.

At step 920, the first wireless communication device switches from the first beam direction to a second beam direction to serve a third wireless communication device (e.g., the wireless communication device 208), denoted as RX3. For example, the first wireless communication device may determine that the signal strength in the second beam direction towards the third wireless communication device is greater than the signal strength in the first beam direction towards the third wireless communication device.

At step 930, after switching to the second beam direction, the first wireless communication device monitors the channel in the second beam direction for a CR (e.g., the CRs 712) for at least one TTI (e.g., the TTI 704).

At step 940, when no CR is detected, the first wireless communication device begins to serve a second data burst to the third wireless communication device in the second beam direction, for example, by employing the scheme 700 and the method 800.

At step 950, when a CR is detected, the first wireless communication device waits for a backoff period and repeats the monitoring at the step 930. The backoff period can be configured to any suitable amount of time and may be based on the reservation period indicated in the detected CR or any other data delivery metric.

Figure 10:
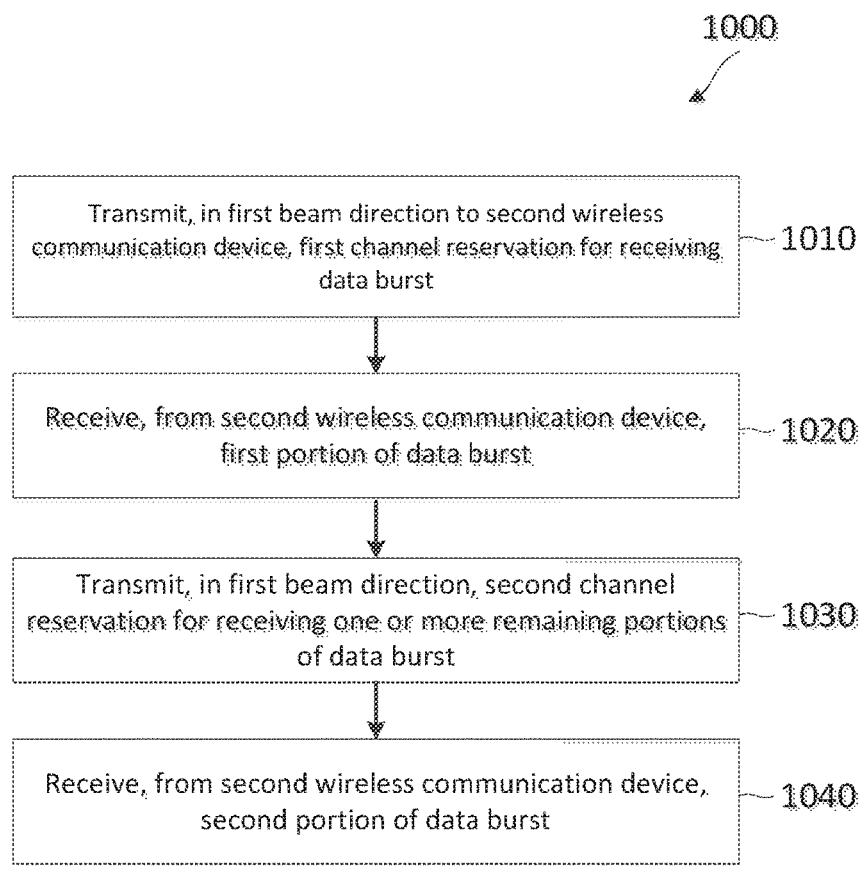
FIG. 10 is a flow diagram of a method of performing data reception in an improved LBT procedure according to embodiments of the present disclosure.

FIG. 10 is a flow diagram of a method 1000 of performing data reception in an improved LBT procedure (e.g., the scheme 700) according to embodiments of the present disclosure. Steps of the method 1000 can be executed by a computing device (e.g., a processor, processing circuit, and/or other suitable component) of a wireless communication device, such as the BSs 104, the UEs 102, and the wireless communication devices 202, 204, 206, 207, and 208. The method 1000 may employ similar mechanisms as in the improved LBT scheme 700 described with respect to FIG. 7 and the methods 800 and 900. The method 1000 can be better understood with reference to FIG. 7. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes transmitting, in a first beam direction (e.g., the beam directions 242, 244, 246, and 248) to a second wireless communication device, a first channel reservation (e.g., the CRs 712) for receiving a data burst (e.g., the data burst 710). For example, the first channel reservation may indicate a reservation period for a burst duration (e.g., the time interval 722).

At step 1020, the method 1000 includes receiving, from the second wireless communication device, a first portion (e.g., the data portions 714) of the data burst.

At step 1030, the method 1000 includes transmitting, in the first beam direction, a second channel reservation for receiving remaining one or more portions of the data burst. For example, the second channel reservation may indicate a reservation period for a remaining burst duration (e.g., the time intervals 724 and 726).

At step 1040, the method 1000 includes receiving, from the second wireless communication device, a second portion of the data burst.

Figure 11:
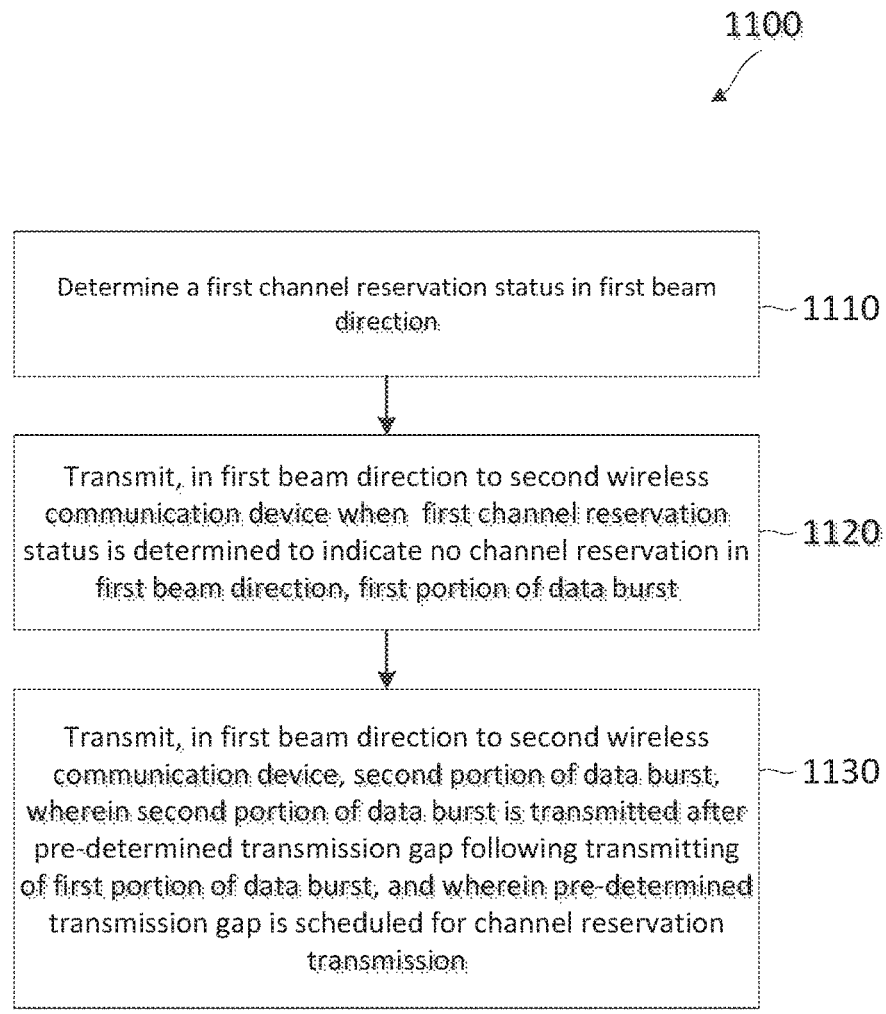
FIG. 11 is a flow diagram of a method of performing data transmission in an improved LBT procedure according to embodiments of the present disclosure

FIG. 11 is a flow diagram of a method 1100 of performing data transmission in an improved LBT procedure (e.g., the scheme 700) according to embodiments of the present disclosure. Steps of the method 1100 can be executed by a computing device (e.g., a processor, processing circuit, and/or other suitable component) of a wireless communication device, such as the BSs 104, the UEs 102, and the wireless communication devices 202, 204, 206, 207, and 208. The method 1100 may employ similar mechanisms as in the improved LBT scheme 700 described with respect to FIG. 7 and the methods 800 and 900. The method 1100 can be better understood with reference to FIG. 7. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes determining a first channel reservation status (e.g., detection of the CRs 712) in a first beam direction the beam directions 242, 244, 246, and 248).

At step 1120, the method 1100 includes transmitting, in the first beam direction to a second wireless communication device when the first channel reservation status is determined to indicate no channel reservation in the first beam direction, a first portion (e.g., the data portions 714) of a data burst (e.g., the data burst 710).

At step 1130, the method 1100 includes transmitting, in the first beam direction to the second wireless communication device, a second portion of the data burst. The second portion of the data burst is transmitted after a pre-determined transmission gap (e.g., the gap periods 702) following the transmitting of the first portion of the data burst. The pre-determined transmission gap is scheduled for channel reservation (e.g., the CRs 712) transmission.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising transmitting, by a first wireless communication device to a second wireless communication device in a first beam direction, a first channel reservation for receiving a data burst. The method further includes receiving, by the first wireless communication device from the second wireless communication device, a first portion of the data burst. The method further includes transmitting, by the first wireless communication device in the first beam direction, a second channel reservation for receiving one or more remaining portions of the data burst. The method further includes receiving, by the first wireless communication device from the second wireless communication device, a second portion of the data burst.

The method further includes wherein the first channel reservation indicates a reservation period including at least a burst duration of the data burst. Accordingly, in some instances, the first wireless communication device can configure the first channel reservation to indicate a reservation period including at a least a burst duration of the data burst. The method further includes wherein the second channel reservation indicates a reservation period including at least a remaining burst duration of the one or more remaining portions of the data burst. Accordingly, in some instances, the first wireless communication device can configure the second channel reservation to indicate a reservation period including at least a remaining burst duration of the one or more remaining portions of the data burst. The method further includes wherein the first channel reservation indicates a first reservation period including a plurality of transmission time intervals (TTIs) spaced apart by a gap period, wherein the first portion of the data burst is received in a first TTI of the plurality of TTIs, and wherein the second portion of the data burst is received in a second TTI of the plurality of TTIs. Accordingly, in some instances, the first wireless communication device can configure the first channel reservation to indicate a first reservation period including a plurality of transmission time intervals (TTIs) spaced apart by a gap period. The method further includes wherein the second channel reservation is transmitted in a gap period between the first TTI and the second TTI. The method further includes wherein M represents a number of the one or more remaining portions of the data burst, wherein M is a positive integer, and wherein the second channel reservation indicates a second reservation period including M of the plurality of TTIs. The method further includes receiving, by the first wireless communication device, a schedule indicating the plurality of TTIs scheduled for the data burst. Accordingly, in some instances, the first wireless communication device can configure the second channel reservation to indicate a second reservation period including M of the plurality of TTIs. The method further includes transmitting, by the first wireless communication device, a schedule indicating the plurality of TTIs scheduled for the data burst.

Embodiments of the present disclosure further include a method comprising determining, by a first wireless communication device, a first channel reservation status in a first beam direction. The method further includes transmitting, by the first wireless communication device in the first beam direction to a second wireless communication device when the first channel reservation status is determined to indicate no channel reservation in the first beam direction, a first portion of a data burst. The method further includes transmitting, by the first wireless communication device in the first beam direction to the second wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

The method further includes switching, by the first wireless communication device, to the first beam direction from a second beam direction. The method further includes determining, by the first wireless communication device, a first signal strength between the first wireless communication device and the second wireless communication device in the first beam direction. The method further includes determining, by the first wireless communication device, a second signal strength between the first wireless communication device and the second wireless communication device in the second beam direction. The method further includes wherein the first wireless communication device switches from the second beam direction to the first beam direction when the first signal strength in the first beam direction is greater than the second signal strength in the second beam direction. Accordingly, in some instances, the first wireless communication device can configure the first wireless communication device to switch from the second beam direction to the first beam direction when the first signal strength in the first beam direction is greater than the second signal strength in the second beam direction. The method further includes wherein the first portion of the data burst and the second portion of the data burst are each transmitted in a transmission time interval (TTI). The method further includes wherein the determining includes monitoring, for at least one TTI after the switching, for a channel reservation in the first beam direction. The method further includes delaying, by the first wireless communication device when the first channel reservation status is determined to indicate a first channel reservation in the first beam direction, for a backoff period. The method further includes monitoring, by the first wireless communication device after the delaying, for a second channel reservation in the first beam direction. The method further includes transmitting, by the first wireless communication device, a schedule indicating a plurality of transmission time intervals (TTIs) scheduled for the data burst. The method further includes receiving, by the first wireless communication device, a schedule indicating a plurality of transmission time intervals (TTIs) scheduled for the data burst.

Embodiments of the present disclosure further include an apparatus comprising a transmitter configured to transmit, to a first wireless communication device in a first beam direction, a first channel reservation for receiving a data burst. The transmitter is further configured to transmit, in the first beam direction, a second channel reservation for receiving one or more remaining portions of the data burst. The apparatus further comprises a receiver configured to receive, from the first wireless communication device, a first portion of the data burst. The receiver is further configured to receive, from the first wireless communication device, a second portion of the data burst.

The apparatus further includes wherein the first channel reservation indicates a reservation period including at least a burst duration of the data burst. The apparatus further includes wherein the second channel reservation indicates a reservation period including at least a remaining burst duration of the one or more remaining portions of the data burst. The apparatus further includes wherein the first channel reservation indicates a first reservation period including a plurality of transmission time intervals (TTIs) spaced apart by a gap period, wherein the first portion of the data burst is received in a first TTI of the plurality of TTIs, and wherein the second portion of the data burst is received in a second TTI of the plurality of TTIs. The apparatus can further includes an arrangement where a second channel reservation is transmitted in a gap period between the first TTI and the second TTI. The apparatus further includes wherein M represents a number of the one or more remaining portions of the data burst, wherein M is a positive integer. The apparatus further includes wherein the second channel reservation indicates a second reservation period including M of the plurality of TTIs. The apparatus further includes wherein the receiver is further configured to receive a schedule indicating the plurality of TTIs scheduled for the data burst. The apparatus further includes wherein the transmitter is further configured to transmit a schedule indicating the plurality of TTIs scheduled for the data burst.

Embodiments of the present disclosure further include an apparatus comprising a processor configured to determine a first channel reservation status in a first beam direction. The apparatus further includes a transmitter configured to transmit, in the first beam direction to a first wireless communication device when the first channel reservation status is determined to indicate no channel reservation in the first beam direction, a first portion of a data burst. The transmitter is further configured to transmit, in the first beam direction to the first wireless communication device, a second portion of the data burst. The apparatus further includes wherein the second portion of the data burst is transmitted after a pre-determined transmission gap following the transmitting of the first portion of the data burst. The apparatus further includes wherein the pre-determined transmission gap is scheduled for a channel reservation transmission. The processor is further configured to switch to the first beam direction from a second beam direction. The processor is further configured to determine a first signal strength between the apparatus and the first wireless communication device in the first beam direction. The processor is further configured to determine a second signal strength between the apparatus and the first wireless communication device in the second beam direction. The apparatus further includes wherein the apparatus switches from the second beam direction to the first beam direction when the first signal strength in the first beam direction is greater than the second signal strength in the second beam direction. The apparatus further includes wherein the first portion of the data burst and the second portion of the data burst are each transmitted in a transmission time interval (TTI), and wherein the processor is further configured to determine the first channel reservation status by monitoring, for at least one TTI after the apparatus switches to the first beam direction, for a channel reservation in the first beam direction. The processor is further configured to delay, when the first channel reservation status is determined to indicate a first channel reservation in the first beam direction, for a backoff period. The processor is further configured to monitor, after the delaying, for a second channel reservation in the first beam direction. The transmitter is further configured to transmit a schedule indicating a plurality of transmission time intervals (TTIs) scheduled for the data burst. The apparatus further includes a receiver further configured to receive a schedule indicating a plurality of transmission time intervals (TTIs) scheduled for the data burst.

Embodiments of the present disclosure further include a computer-readable medium having program code recorded thereon, the program code comprising code for causing a first wireless communication device to transmit, to a second wireless communication device in a first beam direction, a first channel reservation for receiving a data burst. The computer-readable medium further includes code for causing the first wireless communication device to receive, from the second wireless communication device, a first portion of the data burst. The computer-readable medium further includes code for causing the first wireless communication device to transmit, in the first beam direction, a second channel reservation for receiving one or more remaining portions of the data burst. The computer-readable medium further includes code for causing the first wireless communication device to receive, from the second wireless communication device, a second portion of the data burst.

The computer-readable medium further includes wherein the first channel reservation indicates a reservation period including at least a burst duration of the data burst. The computer-readable medium further includes wherein the second channel reservation indicates a reservation period including at least a remaining burst duration of the one or more remaining portions of the data burst. The computer-readable medium further includes wherein the first channel reservation indicates a first reservation period including a plurality of transmission time intervals (TTIs) spaced apart by a gap period. The computer-readable medium further includes wherein the first portion of the data burst is received in a first TTI of the plurality of TTIs. The computer-readable medium further includes wherein the second portion of the data burst is received in a second TTI of the plurality of TTIs. The computer-readable medium further includes wherein the second channel reservation is transmitted in a gap period between the first TTI and the second TTI. The computer-readable medium further includes wherein M represents a number of the one or more remaining portions of the data burst. The computer-readable medium further includes wherein M is a positive integer, and wherein the second channel reservation indicates a second reservation period including M of the plurality of TTIs. The computer-readable medium further includes code for causing the first wireless communication device to receive a schedule indicating the plurality of TTIs scheduled for the data burst. The computer-readable medium further includes code for causing the first wireless communication device to transmit a schedule indicating the plurality of TTIs scheduled for the data burst.

Embodiments of the present disclosure further include a computer-readable medium having program code recorded thereon, the program code comprising code for causing a first wireless communication device to determine a first channel reservation status in a first beam direction. The computer-readable medium further includes code for causing the first wireless communication device to transmit, in the first beam direction to a second wireless communication device when the first channel reservation status is determined to indicate no channel reservation in the first beam direction, a first portion of a data burst. The computer-readable medium further includes code for causing the first wireless communication device to transmit, in the first beam direction to the second wireless communication device, a second portion of the data burst. The computer-readable medium further includes wherein the second portion of the data burst is transmitted after a pre-determined transmission gap following the transmitting of the first portion of the data burst, and wherein the pre-determined transmission gap is scheduled for a channel reservation transmission.

The computer-readable medium further includes code for causing the first wireless communication device to switch to the first beam direction from a second beam direction. The computer-readable medium further includes code for causing the first wireless communication device to determine a first signal strength between the first wireless communication device and the second wireless communication device in the first beam direction. The computer-readable medium further includes code for causing the first wireless communication device to determine a second signal strength between the first wireless communication device and the second wireless communication device in the second beam direction. The computer-readable medium further includes wherein the first wireless communication device switches from the second beam direction to the first beam direction when the first signal strength in the first beam direction is greater than the second signal strength in the second beam direction. The computer-readable medium further includes wherein the first portion of the data burst and the second portion of the data burst are each transmitted in a transmission time interval (TTI), and wherein the code for causing the first wireless communication device to determining the first channel reservation status is further configured to monitor, for at least one TTI after the first wireless communication device switches to the first beam direction, for a channel reservation in the first beam direction. The computer-readable medium further includes code for causing the first wireless communication device to delay, when the first channel reservation status is determined to indicate a first channel reservation in the first beam direction, for a backoff period. The computer-readable medium further includes code for causing the first wireless communication device to monitor, after the delaying, for a second channel reservation in the first beam direction. The computer-readable medium further includes code for causing the first wireless communication device to transmit a schedule indicating a plurality of transmission time intervals (TTIs) scheduled for the data burst. The computer-readable medium further includes code for causing the first wireless communication device to receive a schedule indicating a plurality of transmission time intervals (TTIs) scheduled for the data burst.

Embodiments of the present disclosure further include an apparatus comprising means for transmitting, to a first wireless communication device in a first beam direction, a first channel reservation for receiving a data burst. The apparatus further includes means for receiving, from the first wireless communication device, a first portion of the data burst. The apparatus further includes means for transmitting, in the first beam direction, a second channel reservation for receiving one or more remaining portions of the data burst. The apparatus further includes means for receiving, from the first wireless communication device, a second portion of the data burst.

The apparatus further includes wherein the first channel reservation indicates a reservation period including at least a burst duration of the data burst. The apparatus further includes wherein the second channel reservation indicates a reservation period including at least a remaining burst duration of the one or more remaining portions of the data burst. The apparatus further includes wherein the first channel reservation indicates a first reservation period including a plurality of transmission time intervals (TTIs) spaced apart by a gap period, wherein the first portion of the data burst is received in a first TTI of the plurality of TTIs, and wherein the second portion of the data burst is received in a second TTI of the plurality of TTIs. The apparatus further includes wherein the second channel reservation is transmitted in a gap period between the first TTI and the second TTI. The apparatus further includes wherein M represents a number of the one or more remaining portions of the data burst. The apparatus further includes wherein M is a positive integer, and wherein the second channel reservation indicates a second reservation period including M of the plurality of TTIs. The apparatus further includes means for receiving a schedule indicating the plurality of TTIs scheduled for the data burst. The apparatus further includes means for transmitting a schedule indicating the plurality of TTIs scheduled for the data burst.

Embodiments of the present disclosure further include an apparatus comprising means for determining a first channel reservation status in a first beam direction. The apparatus further includes means for transmitting, in the first beam direction to a first wireless communication device when the first channel reservation status is determined to indicate no channel reservation in the first beam direction, a first portion of a data burst. The apparatus further includes means for transmitting, in the first beam direction to the first wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

The apparatus further includes means for switching to the first beam direction from a second beam direction. The apparatus further includes means for determining a first signal strength between the apparatus and the first wireless communication device in the first beam direction. The apparatus further includes means for determining a second signal strength between the apparatus and the first wireless communication device in the second beam direction. The apparatus further includes wherein the apparatus switches from the second beam direction to the first beam direction when the first signal strength in the first beam direction is greater than the second signal strength in the second beam direction. The apparatus further includes wherein the first portion of the data burst and the second portion of the data burst are each transmitted in a transmission time interval (TTI). The apparatus further includes wherein the means for determining the first channel reservation status is further configured to monitor, for at least one TTI after the apparatus switches to the first beam direction, for a channel reservation in the first beam direction. The apparatus further includes means for delaying, when the first channel reservation status is determined to indicate a first channel reservation in the first beam direction, for a backoff period. The apparatus further includes means for monitoring, after the delaying, for a second channel reservation in the first beam direction. The apparatus further includes means for transmitting a schedule indicating a plurality of transmission time intervals (TTIs) scheduled for the data burst. The apparatus further includes means for receiving a schedule indicating a plurality of transmission time intervals (TTIs) scheduled for the data burst. Other means embodiments may also include the other discussed system, device, and method features discussed in this disclosure.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   determining, by a first wireless communication device, a beam direction for communicating with a second wireless communication device;
   transmitting, by the first wireless communication device to the second wireless communication device in the determined beam direction, a first channel reservation for receiving a data burst from the second wireless communication device;
   receiving, by the first wireless communication device from the second wireless communication device, a first portion of the data burst;
   transmitting, by the first wireless communication device in the determined beam direction, a second channel reservation for receiving one or more remaining portions of the data burst from the second wireless communication device; and
   receiving, by the first wireless communication device from the second wireless communication device, a second portion of the one or more of remaining portions of the data burst.

2. The method of claim 1, further comprising configuring the first channel reservation to indicate a reservation period including at least a burst duration of the data burst.

3. The method of claim 1, further comprising configuring the second channel reservation to indicate a reservation period including at least a remaining burst duration of the one or more remaining portions of the data burst.

4. The method of claim 1, further comprising configuring the first channel reservation to indicate a first reservation period including a plurality of transmission time intervals (TTIs) spaced apart by a gap period, wherein the receiving the first portion of the data burst includes receiving the first portion of the data burst in a first TTI of the plurality of TTIs, and wherein the receiving the second portion of the data burst includes receiving the second portion of the data burst in a second TTI of the plurality of TTIs.

5. The method of claim 4, wherein the transmitting the second channel reservation includes transmitting the second channel reservation in a gap period between the first TTI and the second TTI.

6. The method of claim 4, wherein M represents a number of the one or more remaining portions of the data burst, wherein M is a positive integer, and wherein the method further comprises configuring the second channel reservation to indicate a second reservation period including M of the plurality of TTIs.

7. The method of claim 4, further comprising receiving, by the first wireless communication device, a schedule indicating the plurality of TTIs scheduled for the data burst.

8. The method of claim 4, further comprising transmitting, by the first wireless communication device, a schedule indicating the plurality of TTIs scheduled for the data burst.

9. A method of wireless communication, comprising:
   determining, by a first wireless communication device, a first beam direction for communicating with a second wireless communication device;
   monitoring, by the first wireless communication device, for a first channel reservation in the determined first beam direction;
   transmitting, by the first wireless communication device in the first beam direction to the second wireless communication device, a first portion of a data burst when there is no first channel reservation detected in the determined first beam direction; and
   transmitting, by the first wireless communication device in the first beam direction to the second wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

10. The method of claim 9, further comprising switching, by the first wireless communication device, to the first beam direction from a second beam direction based on the determining.

11. The method of claim 10, further comprising:
    determining, by the first wireless communication device, a first signal strength between the first wireless communication device and the second wireless communication device in the first beam direction;
    determining, by the first wireless communication device, a second signal strength between the first wireless communication device and the second wireless communication device in the second beam direction; and
    configuring the first wireless communication device to switch from the second beam direction to the first beam direction when the first signal strength in the first beam direction is greater than the second signal strength in the second beam direction.

12. The method of claim 10, wherein the transmitting the first portion of the data burst includes transmitting the first portion of the data burst in a transmission time interval (TTI), wherein the transmitting the second portion of the data burst includes transmitting the second portion of the data burst in another TTI, and wherein the monitoring includes monitoring, for at least one TTI after the switching, for the first channel reservation in the determined first beam direction.

13. The method of claim 9, further comprising:
    monitoring, by the first wireless communication device, for a second channel reservation in the determined first beam direction; and delaying, by the first wireless communication device, for a backoff period when the second channel reservation is detected based on the monitoring for the second channel reservation,
wherein the monitoring for the first channel reservation in the determined first beam direction is after the delaying.

14. The method of claim 9, further comprising transmitting, by the first wireless communication device, a schedule indicating a plurality of transmission time intervals (TTIs) scheduled for the data burst.

15. The method of claim 9, further comprising receiving, by the first wireless communication device, a schedule indicating a plurality of transmission time intervals (TTIs) scheduled for the data burst.

16. An apparatus comprising:
a processor configured to determine a beam direction for communicating with a wireless communication device; and
a transmitter configured to:
transmit, to the wireless communication device in the determined beam direction, a first channel reservation for receiving a data burst from the wireless communication device; and
transmit, in the determined beam direction, a second channel reservation for receiving one or more remaining portions of the data burst from the wireless communication device; and
a receiver configured to:
receive, from the wireless communication device, a first portion of the data burst; and
receive, from the wireless communication device, a second portion of the one or more of remaining portions of the data burst.

17. The apparatus of claim 16, wherein the first channel reservation indicates a reservation period including at least a burst duration of the data burst.

18. The apparatus of claim 16, wherein the second channel reservation indicates a reservation period including at least a remaining burst duration of the one or more remaining portions of the data burst.

19. The apparatus of claim 16, wherein the first channel reservation indicates a first reservation period including a plurality of transmission time intervals (TTIs) spaced apart by a gap period, wherein the first portion of the data burst is received in a first TTI of the plurality of TTIs, and wherein the second portion of the data burst is received in a second TTI of the plurality of TTIs.

20. The apparatus of claim 19, wherein the second channel reservation is transmitted in a gap period between the first TTI and the second TTI.

21. The apparatus of claim 19, wherein M represents a number of the one or more remaining portions of the data burst, wherein M is a positive integer, and wherein the second channel reservation indicates a second reservation period including M of the plurality of TTIs.

22. The apparatus of claim 19, wherein the receiver is further configured to receive a schedule indicating the plurality of TTIs scheduled for the data burst.

23. The apparatus of claim 19, wherein the transmitter is further configured to transmit a schedule indicating the plurality of TTIs scheduled for the data burst.

24. An apparatus comprising:
a processor configured to:
determine a first beam direction for communicating with a wireless communication device; and
monitor for a first channel reservation in the determined first beam direction; and
a transmitter configured to:
transmit, in the first beam direction to the wireless communication device, a first portion of a data burst when there is no first channel reservation detected in the determined first beam direction; and
transmit, in the first beam direction to the wireless communication device, a second portion of the data burst, wherein the second portion of the data burst is transmitted after a pre-determined transmission gap following the transmitting of the first portion of the data burst, and wherein the pre-determined transmission gap is scheduled for a channel reservation transmission.

25. The apparatus of claim 24, wherein the processor is further configured to switch to the first beam direction from a second beam direction based on the determining.

26. The apparatus of claim 25, wherein the processor is further configured to:
determine a first signal strength between the apparatus and the wireless communication device in the first beam direction; and
determine a second signal strength between the apparatus and the wireless communication device in the second beam direction, and
wherein the apparatus switches from the second beam direction to the first beam direction when the first signal strength in the first beam direction is greater than the second signal strength in the second beam direction.

27. The apparatus of claim 25, wherein the first portion of the data burst and the second portion of the data burst are each transmitted in a transmission time interval (TTI), and wherein the processor is further configured to monitor for the first channel reservation by monitoring, for at least one TTI after the apparatus switches to the first beam direction, for the first channel reservation in the determined first beam direction.

28. The apparatus of claim 24, wherein the processor is further configured to:
monitor for a second channel reservation in the determined first beam direction;
delay for a backoff period when the second channel reservation is detected based on the monitoring for the second channel reservation; and
monitor, after the delaying, for the first channel reservation in the determined first beam direction.

29. The apparatus of claim 24, wherein the transmitter is further configured to transmit a schedule indicating a plurality of transmission time intervals (TTIs) scheduled for the data burst.

30. The apparatus of claim 24, further comprising a receiver further configured to receive a schedule indicating a plurality of transmission time intervals (TTIs) scheduled for the data burst.

* * * * *